Figure 1:
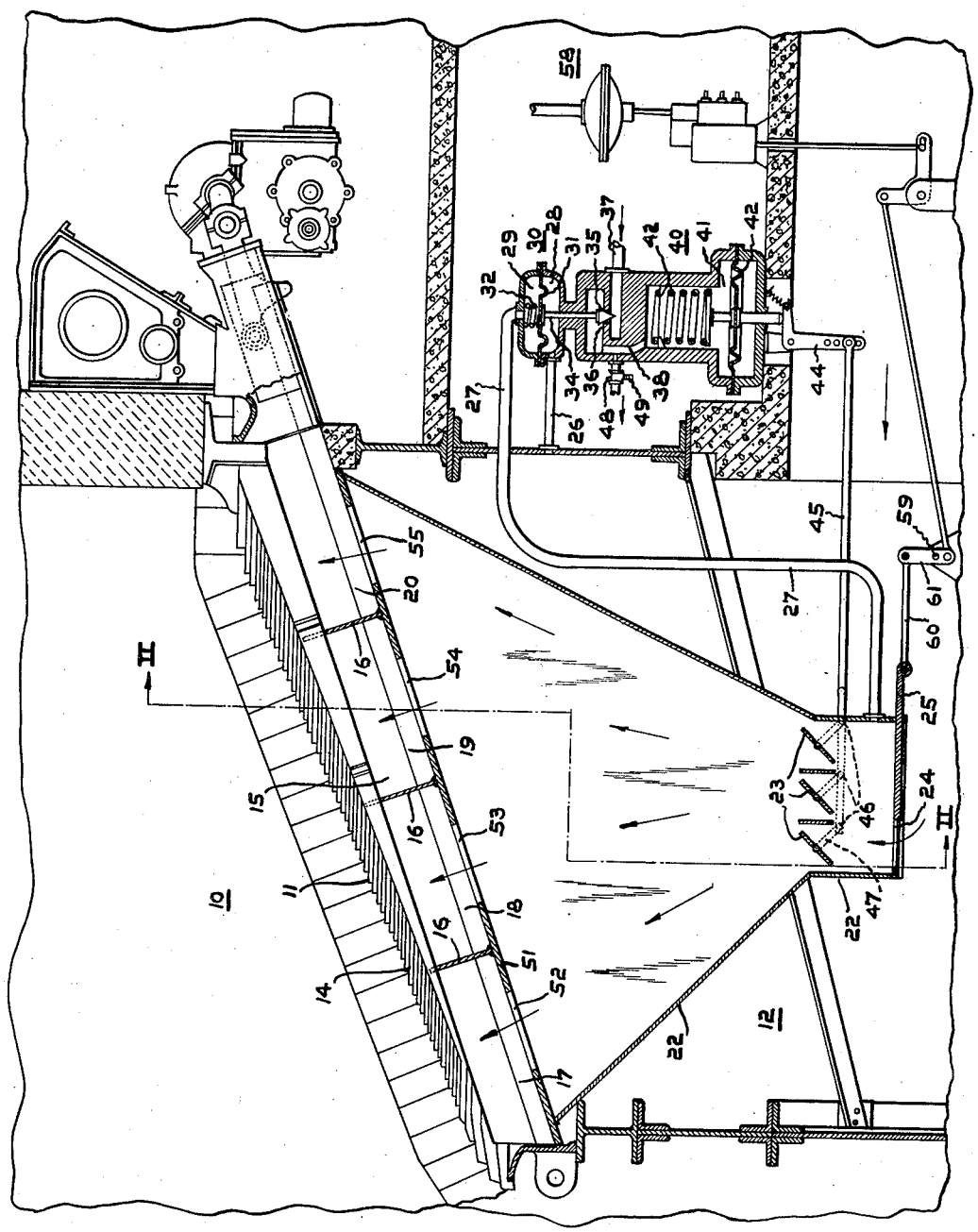

May 21, 1940.　　D. J. MOSSHART　　2,201,241
COMBUSTION APPARATUS
Filed Dec. 31, 1937　　2 Sheets-Sheet 1

WITNESSES:
James K. Mosser
E. Lutz

INVENTOR
DONALD J. MOSSHART.
BY
A. B. Reavis
ATTORNEY

May 21, 1940.　　　D. J. MOSSHART　　　2,201,241
COMBUSTION APPARATUS
Filed Dec. 31, 1937　　　2 Sheets-Sheet 2

Patented May 21, 1940

2,201,241

UNITED STATES PATENT OFFICE 2,201,241

COMBUSTION APPARATUS

Donald J. Mosshart, Springfield, Pa., assignor to Westinghouse Electric & Manufacturing Company, East Pittsburgh, Pa., a corporation of Pennsylvania Application December 31, 1937, Serial No. 182,650

2 Claims. (Cl. 110—44)

My invention relates to underfeed stokers and it has for an object to provide improved air supply means for apparatus of this character.

In underfeed stokers, the channel spaces arranged between adjacent retorts and outwardly of the latter ordinarily supply air from the plenum chamber to the tuyère passages of the tuyère plates covering the channel spaces. Endeavors have heretofore been made to modify the supply of air to the tuyères so as to compensate in a substantial degree for variation in fuel bed resistance, the usual arrangment being to divide each channel space into sections and to have each section supplied with air from the plenum chamber by an individual duct, each duct having a damper and means for adjusting the latter, such means comprising, for example, an orifice admitting air from the plenum chamber to the duct together with apparatus responsive to flow through or differential pressure across the orifice for making the damper adjustment, in order to compensate for change in fuel bed resistance at the region supplied by the duct so as to maintain the air flow rate through each duct substantially constant. Assuming a four-retort stoker and each channel space to be divided into four sections, then, for the five channel spaces, there would be twenty ducts each with its own air flow control equipment.

In accordance with my invention, each of said channel spaces is sectioned or compartmented, as before, but, instead of having a duct for each section or compartment, I provide only one duct for each channel space, that is, instead of four ducts for the four sections of a channel space, there is only one; and, for a four-retort stoker, instead of twenty ducts, there are five. Each duct is provided with damper means adjustable so as to maintain the air flow rate through the duct substantially constant, whereby variation in air flow to the tuyères on account of variation in fuel bed resistance may be minimized. Each duct is provided with an orifice for admitting air thereto from the plenum chamber and a device sensitive to differential pressure across the orifice is used to control the associated damper means, the damper means being so controlled that the differential pressure is kept substantially constant, or within only such narrow variation as is required to effect damper adjustment. Thus, by automatically adjusting the damper means so as to keep the differential pressure across the associated orifices substantially constant, it is assured that the rate of air flow through the orifice is kept substantially constant even though the resistance of the fuel bed of the particular channel supplied may differ relatively to the resistance of the fuel bed at the tuyère row of another channel space. While the apparatus so far described is effective to secure relative transverse control of air to all of the channel spaces, other means should be provided to prevent excessive relative variation in flow through the sections or compartments of each channel space; and, an important feature of my invention is the provision of the last-named means so that a single duct for all of the sections or compartments of a channel space may replace the individual ducts for such sections or compartments. Accordingly, the upper end of my improved duct is arranged to supply air to all of the compartments or sections of a channel space for flow in parallel therethrough to the tuyère row, orifice means being provided between the upper end of the duct and the compartments or sections to prevent excessive relative variation in air flow through the compartments or sections occasioned by variation in fuel bed resistance from end-to-end of the tuyère row.

Accordingly, a further object of my invention is to provide a multiple-retort underfeed stoker with means for supplying air to the tuyère rows thereof and comprising a single duct for each tuyère row with instrumentalities associated with the respective ducts for compensating to a substantial degree for variation in fuel bed resistance both transversely and longitudinally of the stoker.

Figure 2:
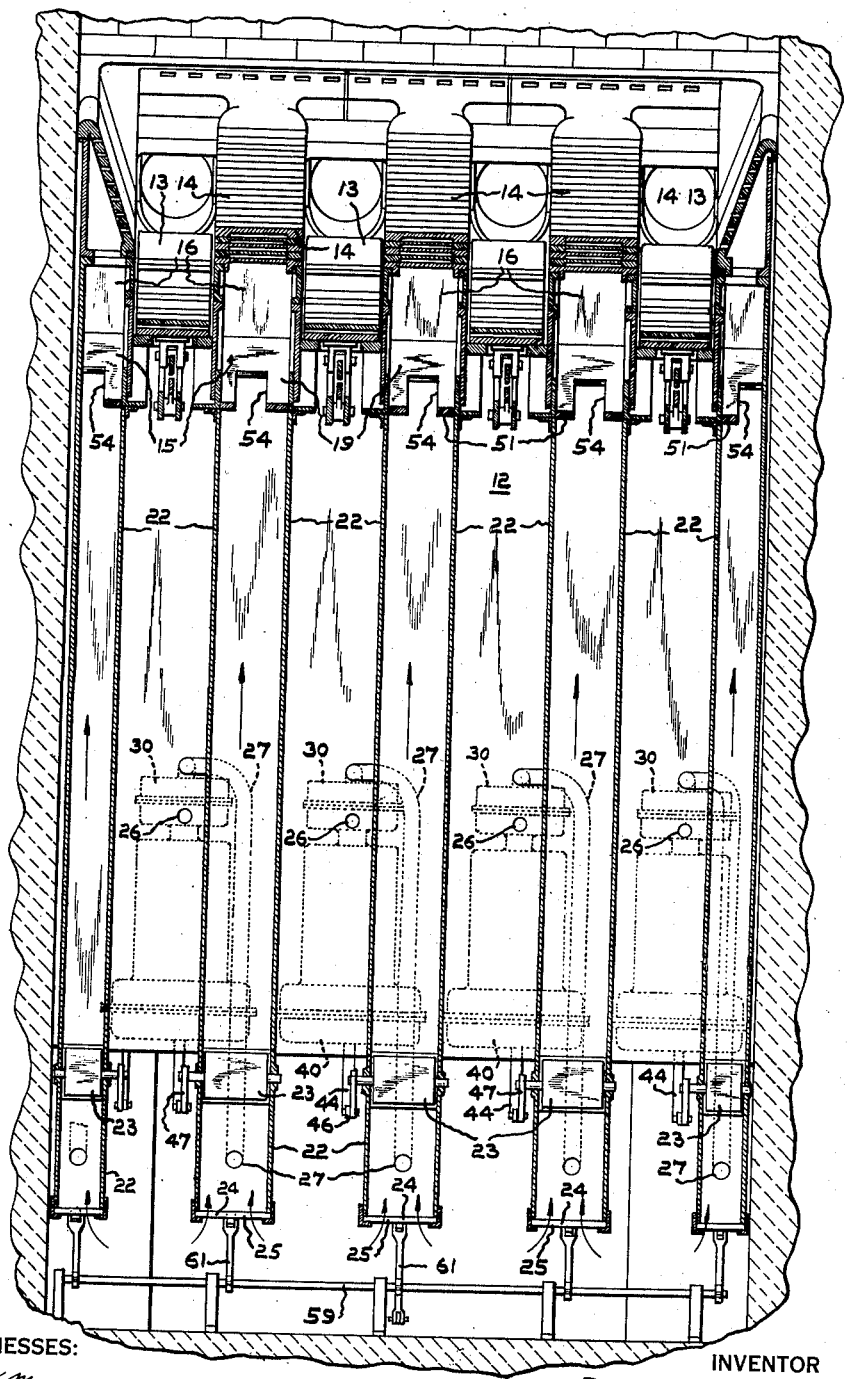

These and other objects are effected by my invention as will be apparent from the following description and claims taken in connection with the accompanying drawings forming a part of this application, in which:

Fig. 1 is a longitudinal sectional view of an underfeed stoker having my improvement applied thereto; and, Fig. 2 is an enlarged transverse sectional view taken along the line II—II of Fig. 1 and looking in the direction of the arrows.

Referring now to the drawings more in detail, there is shown combustion apparatus including a combustion chamber, at 10, an underfeed stoker, at 11, and a plenum chamber, at 12. The underfeed stoker includes alternately arranged retorts 13 and tuyère rows 14, the tuyère rows covering the channel spaces 15 arranged between adjacent retorts and outwardly of the latter and serving to supply air from the plenum chamber for passage through the tuyère passages of the tuyère plates 14 in the usual way.

Instead of having the channel spaces 15 open directly to the plenum chamber 12, special instrumentalities are associated with the channel spaces to assure of substantial compensation for variation in fuel bed resistance, so that a better fuel bed may be maintained and improved performance and combustion secured.

Each channel space 15 is divided by transverse partitions 16 into a plurality of sections or compartments 17, 18, 19 and 20, air flowing in parallel through such sections or compartments to the groups of tuyères immediately thereabove. Instead of having sections or compartments provided in this manner supplied with air by individual ducts from the plenum chamber, I provide a single duct 22 for supplying all of the sections or compartments 17, 18, 19 and 20 of each channel space, the duct 22 being shown as diverging upwardly so that its upper end extends for substantially the full length of the channel space.

Each duct 22 is provided with damper means, at 23, and an orifice 24 for admitting air from the plenum chamber, at 12, to the duct, each orifice 24 preferably having its flow area varied by any suitable means, as, for example, by a movable gate element 25.

The damper means, at 23, of each duct 22 is adjusted in response to a very slight change in differential pressure across the associated orifice 24 in order that the differential pressure across the orifice may be maintained substantially constant, that is, having a very narrow range of variation for the full range of damper adjustment, with the result that the damper means of each duct is effective to maintain the rate of air flow through the duct substantially constant even though the resistance of the fuel bed at the tuyère row supplied by the duct may vary.

Any suitable means sensitive to differential pressure across the orifice of each duct may be used for controlling the damper means of the latter and I find the apparatus illustrated to be very satisfactory for this purpose.

Each orifice 24 has upstream and downstream pressure pipes 26 and 27 associated therewith, these pipes supplying air under pressure to the lower and upper chambers 28 and 29 of the pressure responsive device, at 30, such upper and lower chambers being separated by a diaphragm 31. As the upstream, or plenum chamber pressure, supplied to the lower chamber is higher than the downstream pressure supplied to the upper chamber, a spring 32 is shown associated with the diaphragm to secure the desired response of the latter. With the spring 32 arranged above the diaphragm, it would be of the compression type.

The diaphragm 31 is connected to a valve stem 34 attached to the movable valve element 35 of the valve, at 36, arranged in the fluid pressure or compressed air supply line 37, the valve, at 36, controlling the flow of fluid or compressed air through the passage 38 to the pressure responsive device, at 40.

Preferably, the pressure responsive device, at 40, includes a chamber 41 closed by a diaphragm 42, compressed air or fluid under pressure being supplied by the passage 38 to such chamber. A tension spring 42 is arranged in the chamber 41 and exerts upward bias on the diaphragm 42 opposing the force of air pressure supplied thereto. The diaphragm is connected mechanically to the damper means, at 23, in any suitable manner, as by the bell crank lever 44 and the link 45 having pivotal connections 46 with respect to cranks 47 of the damper means.

The relay or servo-motor apparatus responsive to differential pressure across the orifice 24 of each duct 22 for controlling the damper means, at 23, thereof operates as follows: A very slight change in differential pressure across the orifice 24 occasioned by a change in fuel bed resistance of the tuyère row supplied by the duct causes a change in pressure of air supplied by the conduit 27 to the upper chamber 29 with the result that the valve 35 is moved to restrict or to increase the flow area of the valve, at 36. If the orifice downstream pressure should increase, then the valve, at 36, would be adjusted to restrict its flow area and vice versa. The conduit passage 38 supplied by the valve, at 36, is provided with a bleeder passage 48 having a bleeder valve 39 which may be adjusted to a desired bleeder discharge area. With this arrangement, it will be apparent that adjustment of the movable valve element 35 is a function of the differential pressure across the orifice 24 and that the associated passage 38 with its bleeder outlet 48 provides for a pressure in the passage 38 which is a function of the position of adjustment of the movable valve element 35, that is, the pressure responsive device, at 30, the associated adjustable valve, at 36, and conduit 38 with its bleeder outlet provide a means for transforming a small change in pressure at the downstream side of the orifice into a large change in pressure in the passage 38, the pressures in the passage 38 being kept proportionate to the orifice downstream pressures. In this way, a slight change in orifice downstream pressure is amplified into such a larger change in fluid pressure in the passage 38 as to secure substantially accurate response of the pressure responsive or motor device, at 40, to actuate the associated damper means, at 23.

From the apparatus so far described, it will be seen that all of the sections or compartments of each air channel 15 are supplied by a single duct 22, and that each duct is equipped with its own damper means, inlet orifice, and means sensitive to differential pressure across such orifice for controlling the damper means.

While the arrangement of a single duct 22 for each air channel 15 together with the individual air flow control devices for each duct is operative to secure compensation for variation in fuel bed resistance transversely of the stoker, other means should be provided to compensate for variation in fuel bed resistance at the groups of tuyères for each channel. Therefore, each duct supplies its compartments 17, 18, 19 and 20 with air through orifices 52, 53, 54 and 55, formed in or by any suitable structure, for example, a bottom plate 51, such orifices having flow areas such as to maintain an adequate supply of air to support combustion of the fuel bed above the regions of the groups of tuyères covering the compartments or sections, but the restrictions in areas thereof are such that they afford substantial resistance to change in rate of flow should the fuel bed resistance at the associated group of tuyères change.

From the foregoing, it will be apparent that the ducts 22, one for each air channel 15 covered by tuyères 14, and the associated control devices are effective to secure transverse compensation and that the orifices 52, 53, 54 and 55 through which air is supplied by each duct to the groups of tuyères covering the compartments or sections of the air channel are effective to maintain distributed flow through the orifices with relatively small variation even though there may be substantial variation in fuel bed resistance of the tuyère groups supplied, the orifices 52, 53, 54 and 55, therefore, serving to secure longitudinal compensation for variation in fuel bed resistance.

In order to effect a change in rating of the stoker, I show combustion control apparatus, at 58, of a conventional type and operated in response to load demand to vary the operation of the stoker to secure a combustion rate suitable to load demand. The combustion control apparatus, at 58, is mechanically connected in any suitable manner to a line shaft 59 to which the gates 25 are mechanically connected, as by links 60 and cranks 61 carried by the line shaft 59.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. The combination with an underfeed stoker having alternately arranged retorts and tuyère rows and a plenum chamber supplied with air under suitable pressure arranged therebelow, of means for supplying air from the plenum chamber to the tuyère rows and comprising partitions cooperating with retort side walls to provide a series of air compartments underneath each tuyère row, ducts for supplying air from the plenum chamber to the compartments of the tuyère rows, there being one duct for each tuyère row and each duct being arranged to discharge air for flow in parallel through the compartments of its associated tuyère row to the tuyères thereof, and means providing distributing orifices between each duct and the compartments of the tuyère row supplied thereby; adjustable damper means in each duct; means providing an orifice for each duct for supplying air thereinto from the plenum chamber for flow through the damper means; means for adjusting the flow area of the orifice means so that, for a given plenum chamber pressure, air may be supplied to the stoker suitably to the demand; a differential pressure device for each duct and including chambers and a member associated therewith and movable in response to pressures supplied thereto, a first conduit connecting the plenum chamber and one of said chambers, and a second conduit connecting the space of said inlet portion of the duct between the damper means and the orifice with the other chamber; a motor device for each differential pressure device and including an operated element and means under control of said movable member to supply motive fluid to the motor device so that the operated element of the latter is positioned in predetermined relation with respect to the associated movable member; and means for transmitting motion from each operated element to the damper means of the corresponding duct to open and close such damper means.

2. The combination with an underfeed stoker having alternately arranged retorts and tuyère rows and a plenum chamber supplied with air under suitable pressure, of means for supplying air from the plenum chamber to the tuyère rows and comprising partitions cooperating with retort side walls to provide a series of air compartments underneath each tuyère row, ducts for supplying air from the plenum chamber to the compartments of the respective tuyère rows, each duct including a lower inlet portion and a portion joined to the latter and diverging upwardly so as to extend for the length of its tuyère row in order to discharge air for flow in parallel through the compartments of the tuyère row, and means providing distributing orifices between the discharge end of each duct and the compartments of the tuyère row supplied thereby; adjustable damper means in the inlet portion of each duct; means arranged in the inlet portion, spaced upstream below the damper means, and providing an orifice for each duct for supplying air thereinto from the plenum chamber for flow through the damper means; means for adjusting the flow area of the orifice means so that, for a given plenum chamber pressure, air may be supplied to the stoker suitably to the demand; a differential pressure device for each duct and including chambers and a member associated therewith and movable in response to pressures supplied thereto, a first conduit connecting the plenum chamber and one of said chambers, and a second conduit connecting the space of said inlet portion of the duct between the damper means and the orifice with the other chamber; a motor device for each differential pressure device and including an operated element and means under control of said movable member to supply motive fluid to the motor device so that the operated element of the latter is positioned in predetermined relation with respect to the associated movable member; and means for transmitting motion from each operated element to the damper means of the corresponding duct to open and close such damper means.

DONALD J. MOSSHART.